US012770999B2

(12) United States Patent
Glâtre

(10) Patent No.: US 12,770,999 B2
(45) Date of Patent: Oct. 20, 2026

(54) TRI-FREQUENCY FEEDCHAIN AND DEVICES AND METHODS FOR A TRI-FREQUENCY FEEDCHAIN

(71) Applicant: MacDonald, Dettwiler and Associates Corporation, Sainte-Anne-de-Bellevue (CA)

(72) Inventor: Karim Glâtre, Montreal (CA)

(73) Assignee: MacDonald, Dettwiler and Associates Corporation, Sainte-Anne-de-Bellevue (CA)

( * ) Notice: Subject to any disclaimer, the term of this patent is extended or adjusted under 35 U.S.C. 154(b) by 169 days.

(21) Appl. No.: 18/612,528

(22) Filed: Mar. 21, 2024

(65) Prior Publication Data

US 2024/0332767 A1 Oct. 3, 2024

Related U.S. Application Data

(60) Provisional application No. 63/492,335, filed on Mar. 27, 2023.

(51) Int. Cl.
*H01P 1/161* (2006.01)
*H01P 5/08* (2006.01)

(52) U.S. Cl.
CPC ................ *H01P 1/161* (2013.01); *H01P 5/08* (2013.01)

(58) Field of Classification Search
CPC .... H01P 1/161; H01P 5/08; H01P 5/20; H01P 1/213; H01Q 13/02
See application file for complete search history.

(56) References Cited

U.S. PATENT DOCUMENTS

| | | | | |
|---|---|---|---|---|
| 3,566,309 | A | 2/1971 | Ajioka | |
| 4,052,724 | A | 10/1977 | Takeichi et al. | |
| 2010/0007432 | A1 | 1/2010 | Uher | |
| 2013/0342282 | A1* | 12/2013 | Uher | H01P 1/161 333/135 |

FOREIGN PATENT DOCUMENTS

| | | | | |
|---|---|---|---|---|
| JP | S6058702 A | | 4/1985 | |
| WO | WO-2012172565 A1 | * | 12/2012 | H01P 1/161 |

OTHER PUBLICATIONS

Extended European Search Report issued in respect of European Patent Application No. 24165759.2 on Aug. 7, 2024.

* cited by examiner

*Primary Examiner* — Andrea Lindgren Baltzell
*Assistant Examiner* — Kimberly E Glenn
(74) *Attorney, Agent, or Firm* — Own Innovation; Kent C. Howe; James W. Hinton

(57) ABSTRACT

Provided are apparatuses and methods for a tri-frequency feedchain configured to combine at least three frequency bands on a waveguide. The feedchain includes a turnstile configured to support two orthogonal fundamental modes and combine six filtered signals and a third signal and output the combined signal via an output port. The feedchain also includes at least six filters disposed about the turnstile configured to filter a split signal into the filtered signals. The turnstile is a junction for the filters and includes a port at the interface of each filter and the turnstile for receiving the filtered signal. The turnstile includes a third signal port configured to receive the third signal. The split signals are of an intermediary frequency band comprising a first and second frequency band and the third signal is of a third frequency band. The first, second, and third frequency bands do not intersect.

20 Claims, 8 Drawing Sheets

TRI-FREQUENCY FEEDCHAIN AND DEVICES AND METHODS FOR A TRI-FREQUENCY FEEDCHAIN

TECHNICAL FIELD

The following relates generally to a feedchain for a waveguide apparatus, and more particularly to devices and methods for combining frequency bands on a single waveguide.

INTRODUCTION

Feedchains based on a turnstile configuration allow for the combination of multiple signals of different frequency bands into a single circular waveguide connected to a horn antenna. Existing feedchains based on turnstile topologies utilize a four-arm topology for one frequency band located on the outer part of the turnstile. These feedchains are capable of combining three frequency bands by cascading turnstile junctions. For example, such feedchains may combine frequency bands such as Ka-Rx with Q and V bands (27.5-30.0, 37.5-42.5 and 47.4-51.4 GHz). However, in order to avoid excitation of higher order modes, especially in the transverse electric mode with three half-wave patterns across the width of the waveguide and one half-wave pattern across the height of the waveguide (TE31) at the highest frequency band, the frequency range may be limited. Existing systems utilizing four arms may provide a 1.7 factor from low to high frequency. This factor may be insufficient or sub-optimal for certain bandwidth applications.

Accordingly, there is need for an improved feedchain for waveguide apparatuses that overcomes at least some of the disadvantages of existing approaches.

SUMMARY

Provided herein is an apparatus for combining at least three frequency bands on a single waveguide. The apparatus includes a turnstile supporting two orthogonal fundamental modes, the turnstile configured to receive and combine at least six filtered intermediary signals and a third signal to obtain a combined signal and to output the combined signal to an output port. The apparatus further includes at least six reject filters each connected to and disposed about the turnstile, each respective reject filter configured to receive and filter a split intermediary signal to obtain a respective filtered intermediary signal and to provide the filtered intermediary signal to the turnstile. The split intermediary signals are of an intermediary signal frequency band comprising a first signal frequency band and a second signal frequency band and the third signal is of a third signal frequency band. The first, second, and third frequency bands do not intersect. Each respective reject filter is configured to filter at the third signal frequency band. The turnstile acts as a physical junction connecting one or more of the reject filters and comprises a third signal port for receiving the third signal, the output port, and a port at each interface between the turnstile and each the reject filters.

The apparatus may further include a separating component communicatively and physically connected to each reject filter, the separating component configured to separate an intermediary signal to obtain the at least six split intermediary signals wherein the split intermediary signals are of substantially equal amplitudes and provide one of the split intermediary signals to each reject filter.

The separating component may be configured as an orthomode transducer.

The separating component may include a plurality of magic tees.

The turnstile may receive the third signal from a third signal feedchain communicatively and physically connected to the turnstile at the third signal port. The third signal feedchain may be configured to support the third signal and provide the third signal to the turnstile.

The third signal feedchain may include a third signal first diplexer configured to receive and combine a third signal transmit right hand signal and a third signal receive right hand signal into a third signal right hand signal, a third signal second diplexer configured to receive and combine a third signal transmit left hand signal and a third signal receive left hand signal into a third signal left hand signal, and a third signal septum polarizer communicatively and physically connected to the third signal first diplexer and third signal second diplexer configured to one or more of receive, combine, and circularly polarize the third signal left hand transmit signal and the third signal right hand transmit signal into the third signal.

The apparatus may further include a preliminary feedchain including an intermediary signal first diplexer configured to receive and combine an intermediary right hand receive signal and an intermediary right hand transmit signal into an intermediary right hand signal, an intermediary signal second diplexer configured to receive and combine an intermediary left hand receive signal and an intermediary left hand transmit signal into an intermediary left hand signal, a symmetrical orthomode transducer communicatively and physically connected to the intermediary signal first diplexer and intermediary signal second diplexer and configured to combine the intermediary left hand signal and intermediary right hand signal into an intermediary unpolarized signal, and a corrugated polarizer communicatively and physically connected to the symmetrical orthomode transducer and configured to polarize the intermediary unpolarized signal to obtain the intermediary signal.

The corrugated polarizer may be further configured to circularly polarize the intermediary unpolarized signal wherein the intermediary left hand signal component of the intermediary signal is left hand circularly polarized and the intermediary right hand signal component of the intermediary signal is right hand circularly polarized.

The apparatus may further include a horn antenna communicatively and physically connected to the turnstile and configured to receive and radiate the combined signal.

The third signal frequency band may be higher than the intermediary signal frequency band.

The first signal frequency band may be one or more of 37.5-42.5 GHz and 10-15 GHz.

The second signal frequency band may be one or more of 47.2-51.4 GHz and 10-15 GHz.

The third signal frequency band may be one or more of 71-76 GHz, 81-86 GHz, and 17-32 GHz.

The reject filters may be disposed at an even spacing about a side of the turnstile.

The reject filters may be configured to provide a signal path length from the separating component to the turnstile of equal length.

The third signal port may be disposed at a first end of the turnstile. The third signal port may be configured to receive the third signal orthogonally to the reject filters.

The third signal feedchain may be disposed orthogonally to the reject filters at a first end of the turnstile.

The turnstile in receive operations may be further configured to receive a combined receive signal from a receive waveguide and separate the combined receive signal into at least six split intermediary signals and a third signal.

Each reject filter in receive operations may be further configured to receive and filter a respective split intermediary receive signal from the turnstile to obtain a respective filtered intermediary receive signal.

The third signal feedchain in receive operations may be further configured to support the third receive signal and receive the third receive signal from the turnstile.

The separating component in receive operations may be further configured to receive from each of the reject filters a split intermediary receive signal and combine the received split intermediary receive signals into an intermediary receive signal.

The third signal first diplexer in receive operations may be further configured to receive and split a third signal right hand circularly polarized receive signal into a third signal transmit right hand receive signal and a third signal receive right hand receive signal.

The third signal second diplexer in receive operations may be further configured to receive and split a third signal left hand receive signal into a third signal transmit left hand receive signal and a third signal receive left hand receive signal.

The third signal septum polarizer in receive operations may be further configured to one or more of receive, split, and depolarize the third receive signal into the third signal left hand receive signal and the third signal right hand receive signal.

The intermediary signal first diplexer in receive operations may be further configured to receive and separate an intermediary right hand receive signal into an intermediary right hand receiver receive signal and an intermediary right hand transmitter receive signal.

The intermediary signal second diplexer in receive operations may be further configured to receive and separate an intermediary left hand receive signal into an intermediary left hand receiver receive signal and an intermediary left hand transmitter receive signal.

The symmetrical orthomode transducer in receive operations may be further configured to receive and separate the intermediary receive signal into the intermediary left hand receive signal and intermediary right hand receive signal. The symmetrical orthomode transducer may provide separation of linear polarizations.

The corrugated polarizer in receive operations may be further configured to phase shift the intermediary receive signal. The corrugated polarizer may change the phase shift between the two linear polarizations.

The horn antenna in receive operations may be further configured to collect the combined receive signal and provide the combined receive signal to the turnstile.

An apparatus for combining at least three frequency bands on a single waveguide is also provided. The apparatus includes a turnstile supporting two orthogonal fundamental modes configured to receive a combined receive signal from a receive waveguide and separate the combined receive signal into at least six split intermediary signals and a third signal. The apparatus further includes at least six reject filters each connected to and disposed about the turnstile, each reject filter configured to receive and filter a respective split intermediary receive signal from the turnstile to obtain a respective filtered intermediary receive signal. The apparatus further includes a third signal feedchain communicatively and physically connected to the turnstile, configured to support the third receive signal and receive the third receive signal from the turnstile. The split intermediary receive signals are of an intermediary signal frequency band comprising a first signal frequency band and a second signal frequency band and the third signal is of a third signal frequency band. The first, second, and third frequency bands do not intersect. Each respective reject filter is configured to filter at the third signal frequency band. The turnstile acts as a physical junction connecting one or more of the reject filters, the third signal feedchain, and the output waveguide, and comprises a port at each interface between the turnstile and each of the third signal feedchain, the output waveguide, and the reject filters.

The apparatus may further include a separating component configured to receive from each of the reject filters a split intermediary receive signal and combine the received split intermediary receive signals into an intermediary receive signal.

The separating component may be configured as an orthomode transducer.

The separating component may include a plurality of magic tees.

The third signal feedchain may include a third signal first diplexer configured to receive and split a third signal right hand receive signal into a third signal transmit right hand receive signal and a third signal receive right hand receive signal.

The third signal feedchain may include a third signal second diplexer configured to receive and split a third signal left hand receive signal into a third signal transmit left hand receive signal and a third signal receive left hand receive signal.

The third signal feedchain may include a third signal septum polarizer configured to one or more of receive, split, and depolarize the third receive signal into the third signal left hand receive signal and the third signal right hand receive signal.

The apparatus may further include a preliminary feedchain including an intermediary signal first diplexer configured to receive and separate an intermediary right hand receive signal into an intermediary right hand receiver receive signal and an intermediary right hand transmitter receive signal, an intermediary signal second diplexer configured to receive and separate an intermediary left hand receive signal into an intermediary left hand receiver receive signal and an intermediary left hand transmitter receive signal, a symmetrical orthomode transducer configured to receive and separate the intermediary receive signal into the intermediary left hand receive signal and intermediary right hand receive signal, and a corrugated polarizer configured to depolarize the intermediary receive signal.

The apparatus may further include a horn antenna configured to collect the combined receive signal and provide the combined receive signal to the turnstile.

An orthomode transducer for separating an intermediary signal on a single waveguide is also provided. The intermediary signal is of an intermediary signal frequency band including a first signal frequency band and a second signal frequency band. The orthomode transducer is configured to separate the intermediary signal to obtain at least six split intermediary signals of substantially equal amplitudes and provide each split intermediary signal to a corresponding reject filter of a tri-band waveguide. The tri-band waveguide is configured to combine the split intermediary signals with a third signal of a third frequency band. The first, second, and third frequency bands do not intersect.

The third signal frequency band may be higher than the intermediary signal frequency band.

The first signal frequency band may be one or more of 37.5-42.5 GHz and 10-15 GHz.

The second signal frequency band may be one or more of 47.2-51.4 GHz and 10-15 GHz.

The third signal frequency band may be one or more of 71-76 GHz, 81-86 GHz, and 17-32 GHz.

The orthomode transducer in receive operations may be further configured to receive a split intermediary receive signal from each reject filter and combine the split intermediary signals to obtain an intermediary receive signal.

An orthomode transducer for combining split intermediary receive signals is also provided. The orthomode transducer is configured to receive a split intermediary receive signal from each at least six reject filters and combine the split intermediary signals to obtain an intermediary receive signal.

A method of combining at least three frequency bands on a single waveguide is also provided. The method includes: separating, via a separating component, an intermediary signal into six split intermediary signals; providing each of the six split intermediary signals to a different one of six reject filters, each respective reject filter connected to and positioned about a turnstile; at each respective reject filter, filtering the received split intermediary signal to obtain a filtered intermediary signal, wherein the intermediary signal is of an intermediary signal frequency band comprising a first signal frequency band and a second signal frequency band, and outputting the filtered intermediary signal to the turnstile; combining, by the turnstile, the filtered intermediary signals from each of the six reject filters and a third signal of a third signal frequency band received from a third signal feedchain connected to the turnstile into a combined signal; and outputting the combined signal.

The method may further include obtaining the third signal by receiving and combining by a third signal first diplexer a third signal transmit right hand signal and a third signal receive right hand signal into a third signal right hand signal, receiving and combining by a third signal second diplexer a third signal transmit left hand signal and a third signal receive left hand signal into a third signal left hand signal, and one or more of receiving, combining, and circularly polarizing the third signal left hand signal and the third signal right hand signal to obtain the third signal via a third signal septum polarizer communicatively and physically connected to the third signal first diplexer and the third signal second diplexer.

The method may further include obtaining the intermediary signal by receiving and combining an intermediary right hand receive signal and an intermediary right hand transmit signal into an intermediary right hand signal by an intermediary signal first diplexer, receiving and combining an intermediary left hand receive signal and an intermediary left hand transmit signal into an intermediary left hand signal by an intermediary signal second diplexer, combining the intermediary left hand signal and intermediary right hand signal into an intermediary signal by a symmetrical orthomode transducer communicatively and physically connected to the intermediary signal first diplexer and the intermediary signal second diplexer, and circularly polarizing the intermediary signal by a corrugated polarizer communicatively and physically connected to the symmetrical orthomode transducer, wherein the intermediary left hand signal component of the intermediary signal is left hand circularly polarized and the intermediary right hand signal component of the intermediary signal is right hand circularly polarized.

The method may further include radiating the combined signal by a horn antenna, communicatively and physically connected to the turnstile.

The third signal frequency band may be higher than the intermediary signal frequency band.

The first signal frequency band may be one or more of 37.5-42.5 GHz and 10-15 GHz.

The second signal frequency band may be one or more of 47.2-51.4 GHz and 10-15 GHz.

The third signal frequency band may be one or more of 71-76 GHz, 81-86 GHz, and 17-32 GHz.

The reject filters may be disposed at an even spacing about a side of the turnstile.

The third signal feedchain may be connected to the turnstile and disposed at a first end of the turnstile orthogonally to the reject filters.

The method, in receive operations, may further be for separating at least three frequency bands on the waveguide, the method including receiving, by the turnstile, a combined receive signal, splitting, by the turnstile the combined receive signal into six split intermediary receive signals, and a third receive signal, providing the third receive signal to the third signal feedchain, providing each of the six split intermediary receive signals to a different one of the six reject filters, at each respective reject filter, filtering the received split intermediary receive signal to obtain a filtered intermediary receive signal and providing the filtered intermediary receive signals to the separating component and combining, via the separating component, the filtered intermediary receive signals into an intermediary receive signal.

The method in receive operations may further include, separating the third signal by receiving, separating and/or circularly polarizing the third receive signal, via the third signal septum polarizer to obtain polarizing a third signal left hand receive signal and a third signal right hand receive signal, receiving and separating by a third signal second diplexer the third signal left hand receive signal into a third signal transmit left hand receive signal and a third signal receive left hand receive signal and receiving and separating by a third signal first diplexer the third signal right hand receive signal into a third signal transmit right hand receive signal and a third signal receive right hand receive signal.

The method in receive operations may further include, separating the intermediary receive signal by receiving and depolarizing the intermediary receive signal into an intermediary unpolarized receive signal by the corrugated polarizer, receiving and separating, by the symmetrical orthomode transducer, the intermediary unpolarized signal into an intermediary left hand receive signal and an intermediary right hand receive signal, receive and separate, by the intermediary signal second diplexer, the intermediary left hand receive signal into an intermediary left hand receiver receive signal and an intermediary left hand transmitter receive signal, and receive and separate, by the intermediary signal first diplexer, the intermediary right hand receive signal into an intermediary right hand receiver receive signal and an intermediary right hand transmitter receive signal.

The method in receive operations may further include, by the horn antenna collecting the combined receive signal and providing the combined receive signal to the turnstile.

A method of combining at least three frequency bands on a single waveguide is also provided. The method includes receiving, by a turnstile, a combined receive signal, splitting, by the turnstile the combined receive signal into six split intermediary receive signals, and a third receive signal, providing the third receive signal to a third signal feedchain, providing each of the six split intermediary receive signals to a different one of six reject filters, at each respective reject filter, filtering the received split intermediary receive signal to obtain a filtered intermediary receive signal and providing the filtered intermediary receive signals to a separating component and combining, via the separating component, the filtered intermediary receive signals into an intermediary receive signal. The intermediary receive signal is of an intermediary signal frequency band comprising a first signal frequency band and a second signal frequency band. The third signal is of a third signal frequency band. The first, second, and third frequency bands do not intersect.

The method may further include, separating the third receive signal by receiving, separating and/or depolarizing the third receive signal, via a third signal septum polarizer to obtain polarizing a third signal left hand receive signal and a third signal right hand receive signal, receiving and separating by a third signal second diplexer the third signal left hand receive signal into a third signal transmit left hand receive signal and a third signal receive left hand receive signal and receiving and separating by a third signal first diplexer the third signal right hand receive signal into a third signal transmit right hand receive signal and a third signal receive right hand receive signal.

The method may further include, separating the intermediary receive signal by receiving and depolarizing the intermediary receive signal into an intermediary unpolarized receive signal by a corrugated polarizer, receiving and separating, by a symmetrical orthomode transducer, the intermediary unpolarized signal into an intermediary left hand receive signal and an intermediary right hand receive signal, receive and separate, by an intermediary signal second diplexer, the intermediary left hand receive signal into an intermediary left hand receiver receive signal and an intermediary left hand transmitter receive signal, and receive and separate, by an intermediary signal first diplexer, the intermediary right hand receive signal into an intermediary right hand receiver receive signal and an intermediary right hand transmitter receive signal.

The method in receive operations may further include, by a horn antenna, collecting the combined receive signal and providing the combined receive signal to the turnstile.

The third signal frequency band may be higher than the intermediary signal frequency band.

The first signal frequency band may be one or more of 37.5-42.5 GHz and 10-15 GHz.

The second signal frequency band may be one or more of 47.2-51.4 GHz and 10-15 GHz.

The third signal frequency band may be one or more of 71-76 GHz, 81-86 GHz, and 17-32 GHz.

The reject filters may be disposed at an even spacing about a side of the turnstile.

The third signal feedchain may be connected to the turnstile and disposed at a first end of the turnstile orthogonally to the reject filters.

Other aspects and features will become apparent, to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1A:
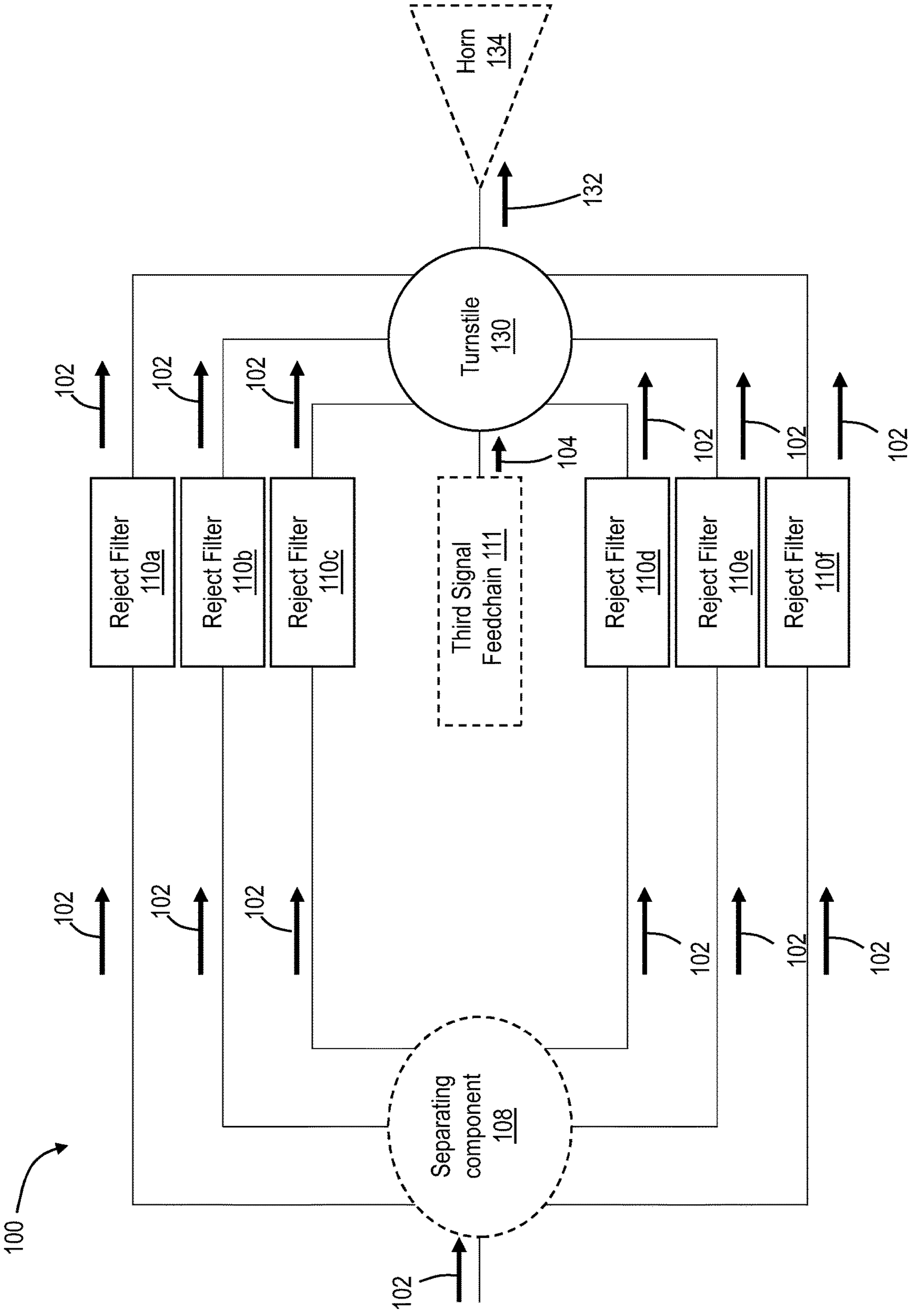
FIG. 1A is a block diagram of a feedchain configured in a six arm configuration of a waveguide, according to an embodiment.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The feedchain of the present disclosure and its method of use is generally described as operating in transmit. It will be appreciated that the feedchain may also operate in receive. It is understood that the feedchain is a passive design. Therefore, the feedchain has reciprocity in transmit and receive. The reciprocity includes that in receive each signal travels the opposite direction through the feedchain as in transmit. The reciprocity further includes that elements and method processes that combine signals in transmit, split a signal in receive. The reciprocity further includes that elements and method processes that split a signal in transmit, combine signals in receive.

The following relates generally to a feedchain for combining multiple signals of distinct frequency bands on a single waveguide. The waveguide may be generally circular and connected to a horn. The feedchain may be configured with a tri-band feed concept. The feedchain may combine an intermediary signal with a third signal. The intermediary signal may be a combination of components and configurations of a first signal and second signal, wherein the first signal is of a frequency band other than a frequency band of the second signal. The third signal may be of a higher frequency band than the frequency band of one or more of the first signal and the second signal.

The feedchain includes six reject filters. The reject filters may also be referred to as arms or connecting arms. The reject filters may substantially filter the intermediary signal by rejecting a wave of the intermediary signal. The rejected wave may be particularly in the frequency range of the band of the third signal. Reject filters also provide a short for the third signal. The short prevents the third signal from coupling to the arms and directs the third signal through the turnstile junction. The six arm turnstile concept reduces excitation of higher order modes, particularly in the TE31 at the highest frequency band passing through the junction with the six arms.

The feedchain may include at least one orthomode transducer to combine and/or separate signals. The orthomode transducer combines and separates the signals coming from the six-arm turnstile.

In another embodiment, the feedchain may include magic tees to combine and/or separate signals coming from the six arm turnstile.

Referring now to FIG. 1A, shown therein is a block diagram of a feedchain 100 of a waveguide, according to an embodiment. The feedchain 100 is configured with a six arm configuration. The feedchain 100 combines an intermediary signal 102 with a third signal 104.

The feedchain 100 may be communicatively and physically connected to a preliminary feedchain. The preliminary feedchain may be the preliminary feedchain 200 of FIG. 2, further described below. The intermediary signal 102 may be provided to the feedchain 100 via the preliminary feedchain 200 of FIG. 2. The intermediary signal 102 may be a signal in which components and/or configurations of a first signal and a second signal are combined. The preliminary feedchain may be of a type other than a type of the feedchain 100, such as a septum polarizer, a regular turnstile, a reverse turnstile or other type of feedchain not limited to waveguide technology.

The frequency band of the first signal differs in range from the frequency band of the second signal. In an embodiment, the frequency band of the first signal is a frequency band with a frequency range of 37.5-42.5 GHz. A signal of this frequency band may be referred to as a Q band signal. In another embodiment, the frequency band of the first signal is a frequency band with a frequency range of 10-15 GHz. A signal of this frequency band may be referred to as a Ku band signal.

In an embodiment, the frequency band of the second signal is a frequency band with a frequency range of 47.2-51.4 GHz. A signal of this frequency band may be referred to as a V band signal. In another embodiment, the frequency band of the second signal is a frequency band with a frequency range of 10-15 GHz. A signal of this frequency band may be referred to as a Ka band signal.

The frequency bands of the first signal and the second signal may be lower than the frequency band of the third signal 104. The third signal 104 may include a transmit (Tx) signal (also referred to as a third transmit signal). A frequency band of the third Tx signal may be a frequency band with a frequency range of 71-76 GHz. A signal of this frequency band may be referred to as an E band Tx signal.

The third signal 104 may further include a receive (Rx) signal (also referred to as a third receive signal). A frequency band of the third Rx signal may be a frequency band with a frequency range of 81-86 GHz. A signal of this frequency band may be referred to as an E band Rx signal. In another embodiment, the frequency band of the third signal 104 is a frequency band with a frequency range of 17-32 GHz.

In a particular embodiment, the first signal is in the Q-band (37.5-42.5 GHz), the second signal is in the V-band (47.2-51.4 GHz), and the third signal includes a Tx signal in the Tx portion of E-band Tx (71-76 GHz) and an Rx signal in the Rx portion of E-band (81-86 GHz).

In another particular embodiment, the first signal is in the Ku-band (10.7-12.7 GHz), the second signal is in the Ku-band (13.00-14.5 GHz), and the third signal 104 includes a Tx signal in the Tx portion of Ka-band Tx (17.3-21.2 GHz) and an Rx signal in the Rx portion of Ka-band (27-31 GHz).

The feedchain 100 may further include a separating component 108. The separating component 108 receives the intermediary signal 102. The separating component 108 separates and outputs the intermediary signal 102 to each reject filter 110, further described below. The separation may be an even division of the amplitude of the intermediary signal 102 to each reject filter 110. The intermediary signal 102 output to each reject filter 110 is otherwise the same signal as the intermediary signal 102 received by the separating component 108. The separating component 108 keeps the two linear polarizations coming from the common apertures separated within the reject filters 110.

In an embodiment, the separating component 108 is configured to provide an equal path length for the intermediary signals 102. These embodiments may support circular polarization such as via an orthomode configuration further described below. Supporting the circular polarization includes maintaining phase alignment of the separated intermediary signals 102 to enable proper combination once filtered. An equal path length is likely to maintain phase alignment of the intermediary signals 102.

Providing the equal path length may include configuring components of the separating component 108 corresponding to each separated intermediary signal 102 to be of equal length. Providing the equal path length may further include configuring the reject filters 110, further described below and any components connecting to the separating component 108 and the reject filters 110 corresponding to each separated intermediary signal 102 to be of equal length. In some embodiments the path length of every component supporting a given separated intermediary signal 102 is equal to that of the corresponding components supporting the remaining separated intermediary signals 102. In other embodiments, the varying path lengths of each component may be combined to provide an overall equal path length.

It will be appreciated that in some embodiments, the relative path length provided by the separating component 108 for each the separated intermediary signal 102 may not be equivalent. These embodiments may include embodiments supporting linear polarization, such as where the separating component is configured to include magic tees, further described below.

In an embodiment, the separating component 108 is an orthomode transducer. In this embodiment, the separating component 108 is configured in an orthomode configuration.

Figure 1B:
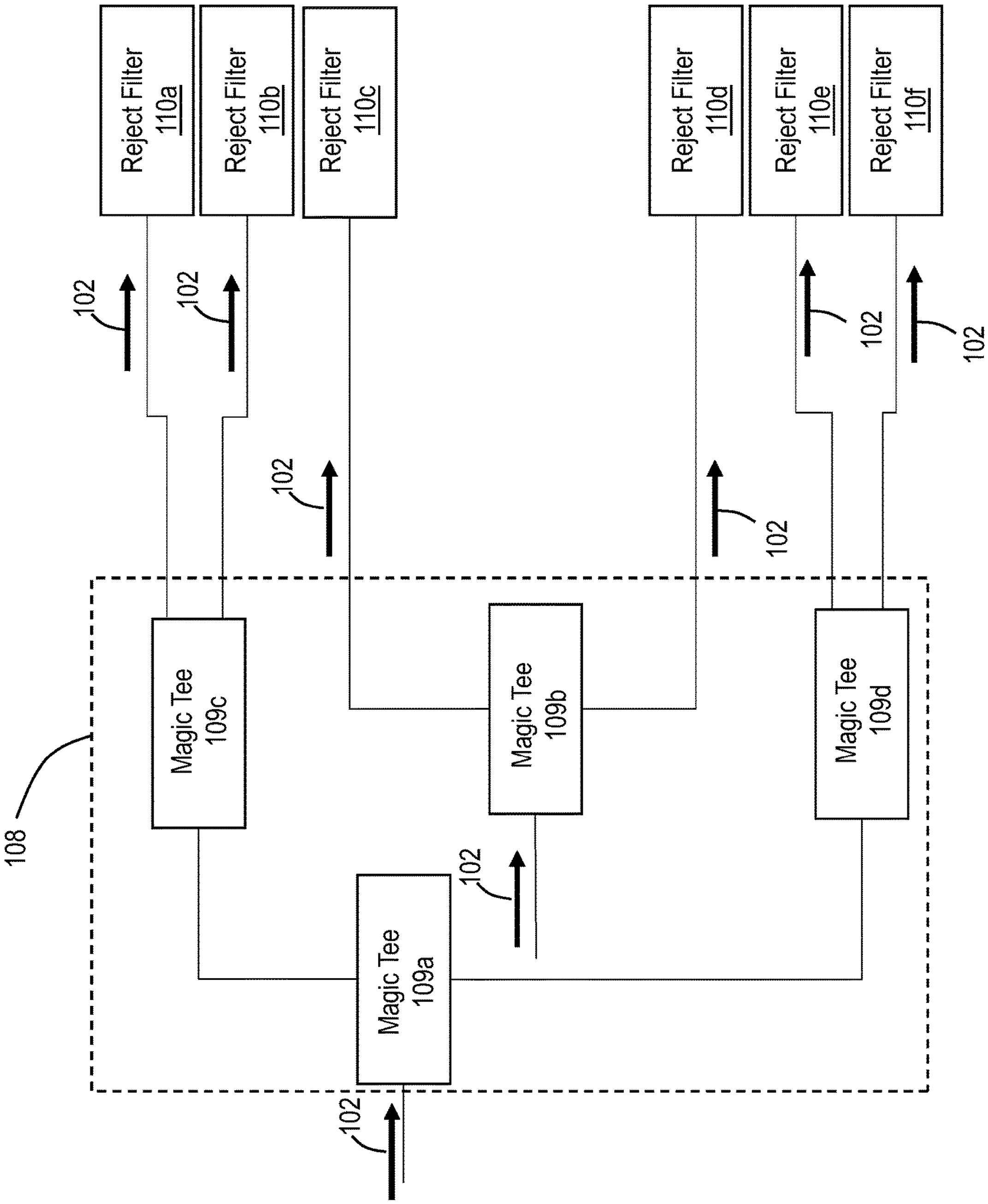
FIG. 1B is a block diagram of a separating component connected to reject filters of FIG. 1A, according to an embodiment.

In an embodiment, the separating component 108 includes magic tees 109*a*-109*d*, as shown in FIG. 1B. Magic tees 109*a*-109*d* are referred to collectively as magic tees 109 and generically as magic tee 109. Each magic tee 109 receives the intermediary signal 102. Each magic tee splits the received intermediary signal 102 and outputs two intermediary signals 102. Each output intermediary signal 102 of Magic tee 109*a* is the received intermediary signal 102 of one of magic tees 109*c* and 109*d*. The output intermediary signals 102 of magic tees 109*b*, 109*c* and 109*d* are provided to the reject filters 110.

Referring again to FIG. 1A, the feedchain 100 further includes reject filters 110*a*-110*f*. The reject filters 110*a*-110*f* are referred to generically as reject filter 110 and collectively as reject filters 110. The reject filters 110 receive the intermediary signal 102 from the separating component 108. The intermediary signal 102 received by the reject filters 110 may be linearly or circularly polarized. The reject filters 110 filter the intermediary signal 102. The reject filters 110 may filter the intermediary signal 102 in the frequency band of the third signal 104.

Figure 1D:
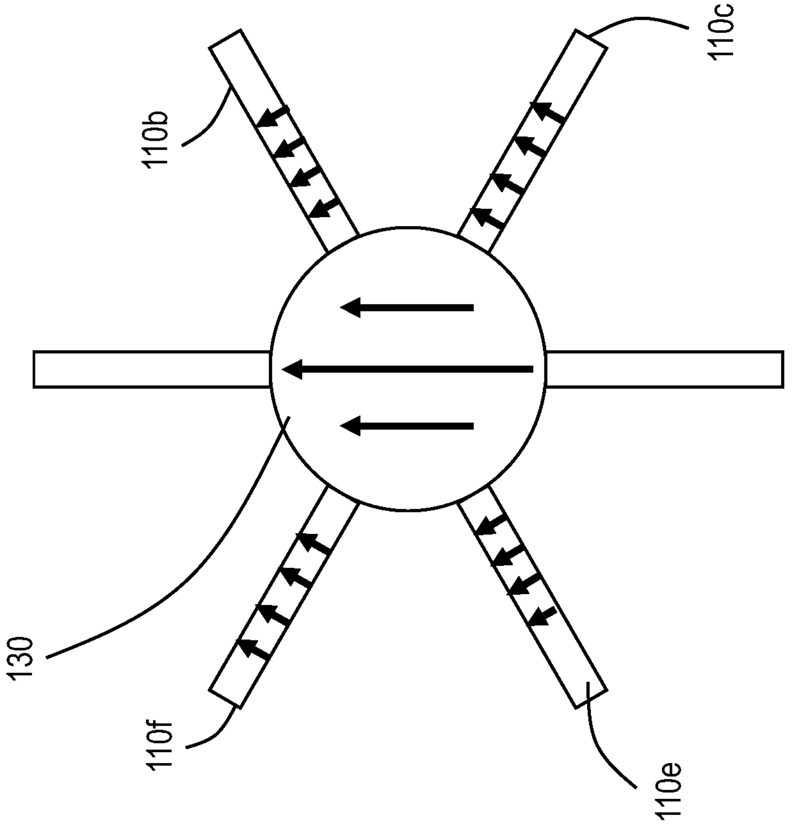
FIG. 1D is a cross sectional schematic of reject filters about a turnstile of FIG. 1A supporting a vertically polarized signal, according to an embodiment.
Figure 1C:
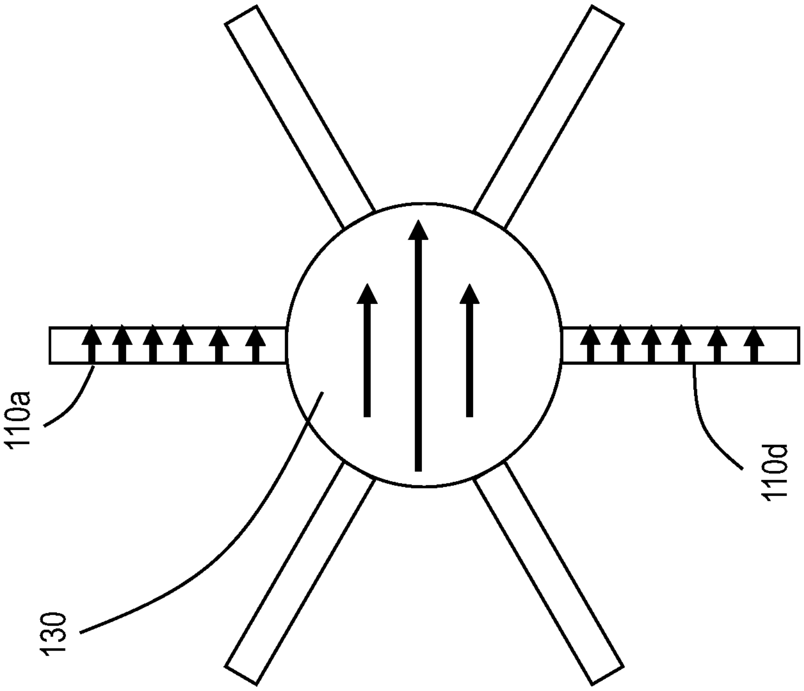
FIG. 1C is a cross sectional schematic of reject filters about a turnstile of FIG. 1A supporting a horizontally polarized signal, according to an embodiment.

Referring now to FIGS. 1C and 1D, in an example, two of the reject filters 110*a* and 110*d* are configured to support a horizontal polarization. The remaining four reject filters 110*b*, 110*c*, 110*e*, and 110*f* are configured to support a vertical polarization. The difference in number of reject filters (two vs four) supporting horizontal versus vertical polarization may be attributed to geometrical reasons. Generally, for an OMT with four arms (separated by 90 degrees), two arms handle each polarization (horizontal and vertical), as the two polarizations are purely aligned to the respective arms. In an embodiment of the present disclosure including six arms (six reject filters), one polarization may be purely aligned with two arms, with the other polarization being orthogonal to those two arms and coupling to the remaining four arms of the six arm configuration (which, in a sense, are somehow aligned to this polarization, one arm is just tilted 30 degrees compared to the polarization plane). It will be appreciated that two reject filters 110 define a first polarization and four reject filters 110 cover a second polarization geometrically.

Circular polarization operation and/or dual linear polarization operation is enabled by this polarization support configuration. It will be appreciated that circular polarization is the sum of two linear polarizations with a phase difference of 90 degrees (orthogonal polarization). In various embodiments, the reject filters 110 may have other configurations, such as, without limitation, stub filters, iris filters, or pin filters.

Referring again to FIG. 1A, the feedchain 100 may further include a third signal feedchain 111. The third signal feedchain 111 provides the third signal 104 to a turnstile 130 further described below. The third signal feedchain 111 may be configured as a septum polarizer feed chain, regular turnstile, and/or reverse turnstile.

Figure 1E:
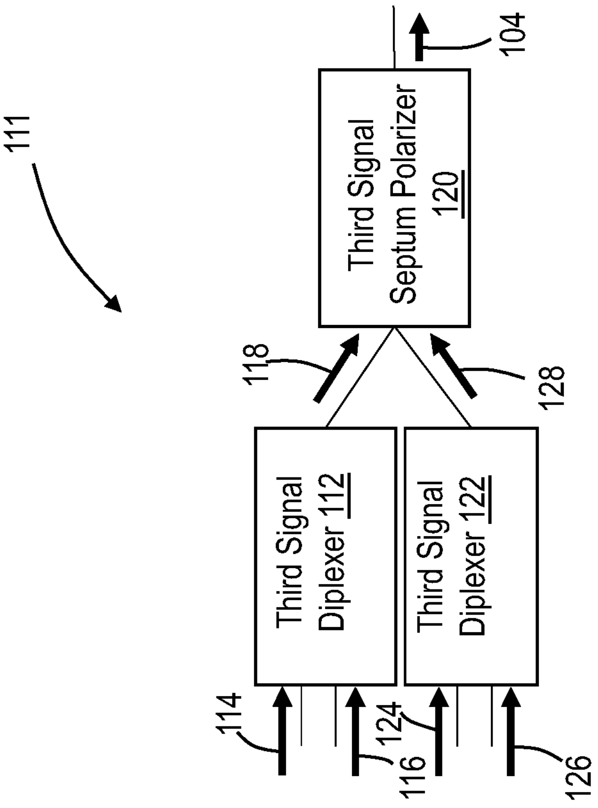
FIG. 1E is a block diagram of the third signal feedchain of FIG. 1A, according to an embodiment.

In an embodiment, as shown in FIG. 1E, the third signal feedchain 111 is configured as a septum polarizer feedchain. The septum polarizer feedchain includes a third signal first diplexer 112. The third signal first diplexer 112 receives a third signal Tx right handed (RH) signal 114 of the third signal 104. The third signal Tx RH signal 114 is a signal of the frequency band of the third signal 104. The third signal Tx RH signal 114 is a transmit signal. A transmit signal may be a signal of a frequency band defined as a standard transmit frequency for satellite communications (Satcoms).

The third signal first diplexer 112 further receives a third signal Rx right handed (RH) signal 116 of the third signal 104. The third signal Rx RH signal 116 is a signal of the frequency band of the third signal 104. The third signal Rx RH signal 116 is a receive signal. A receive signal may be a signal of a frequency band defined as a standard receive frequency for Satcoms.

The third signal first diplexer 112 combines the third signal Tx RH signal 114 and the third signal Rx RH signal 116 into a third RH signal 118. The third signal first diplexer 112 provides the third RH signal 118 to a third signal septum polarizer 120, further described below.

The septum polarizer feedchain 111 of FIG. 1C further includes a third signal second diplexer 122. The third signal second diplexer 122 receives a third signal Tx left handed (LH) signal 124 of the third signal 104. The third signal Tx LH signal 124 is a signal of the frequency band of the third signal 104. The third signal Tx LH signal 124 is a transmit signal.

The third signal second diplexer 122 further receives a third signal Rx left handed (RH) signal 126 of the third signal 104. The third signal Rx LH signal 126 is a signal of the frequency band of the third signal 104. The third signal Rx LH signal 126 is a receive signal.

The third signal second diplexer 122 combines the third signal Tx LH signal 124 and the third signal Rx LH signal 126 into a third LH signal 128. The third signal second diplexer 122 provides the third LH signal 128 to the third signal septum polarizer 120.

The septum polarizer feedchain 111 of FIG. 1E further includes the third signal septum polarizer 120. The third signal septum polarizer 120 combines the third RH signal 118 and the third LH signal 128. The third signal septum polarizer 120 obtains the third signal 104 by combining the third RH signal 118 and the third LH signal 128 and linearly polarizes the third signal 104.

The third signal septum polarizer feedchain 111 of FIG. 1E provides four ports (two polarizations for two bands).

Referring again to FIGS. 1A, 1B, and 1C the feedchain 100 further includes a turnstile 130. The turnstile 130 may be one or more of a waveguide component, a coaxial waveguide, and a ridge waveguide. The turnstile 130 supports two orthogonal fundamental modes. The turnstile 130 may be any shape that supports these modes. For example, the turnstile 130 may be a circular, square, or hexagonal prism.

The turnstile 130 is a physical junction. The turnstile 130 connects the reject filters 110, a common waveguide supporting the third signal 104, and an output waveguide. The interface of these components with the turnstile 130 may be referred to as interface ports or ports. The ports may be waveguide ports and/or coaxial ports such as transvers electromagnetic wave (TEM) lines.

The turnstile 130 receives the third signal 104 from the third signal feedchain 111. The third signal feedchain 111 may be the common waveguide. The third signal feedchain 111 may be connected to turnstile 130 via a first side through port. The first side through port is a port located at a first end of the turnstile 130. The first side through port is oriented orthogonally to a plane formed by the ports of the reject filters 110. This orientation of the first side through port to the ports of the reject filters supports the two orthogonal fundamental modes.

The turnstile 130 also receives the filtered intermediary signal 102 from the reject filters 110*a*-*f* through ports. The turnstile 130 combines the third signal 104 and the filtered intermediary signal 102 into a final signal 132. The ports of the reject filters 110 are positioned about a side of the turnstile 130. The reject filters 110 may be evenly spaced about the side of the turnstile 130. In an embodiment, the turnstile 130 is circular and six reject filters 110 are spaced at 60 degree intervals.

Referring again specifically to FIG. 1A, the feedchain 100 further includes a horn antenna 134 (also referred to as "horn"). The horn 134 is connected to turnstile 130 for receiving the outputted final signal 132 from the turnstile 130. The horn 134 may be a tri-band horn. The horn 134 may be connected to turnstile 130 via a second side through port. The second side through port is a port located at a second end of the turnstile 130. The second side through port is oriented opposite the first side through port. The horn may be a component of the output waveguide. The horn 134 radiates the final signal 132 for one or more of transmission and reception. The horn 134 radiates all the signal from the common waveguide.

Figure 2:
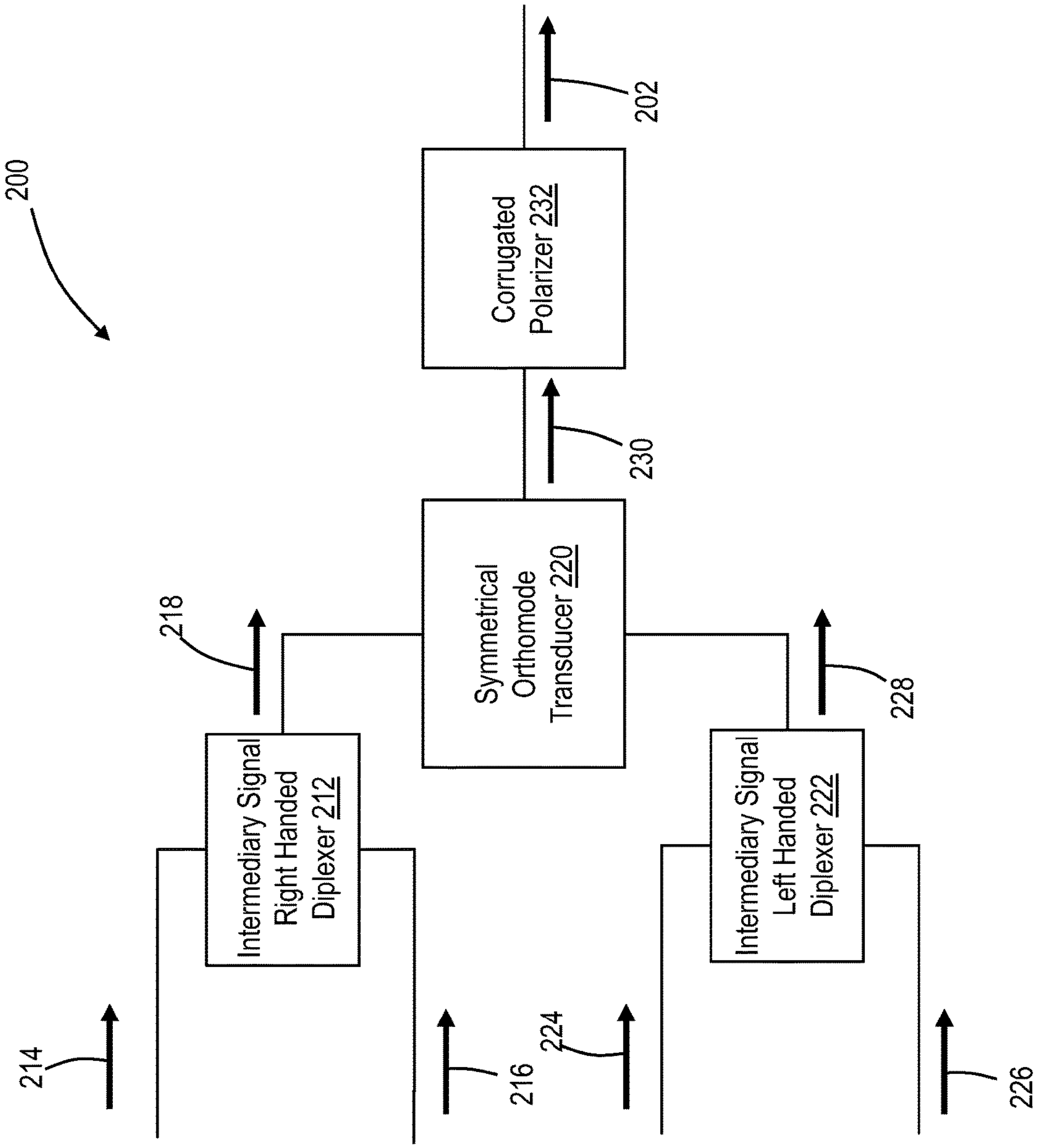
FIG. 2 is a block diagram of a preliminary feedchain of the waveguide of FIG. 1, according to an embodiment.

Referring now to FIG. 2, shown therein is a block diagram of a preliminary feedchain 200, according to an embodiment. The preliminary feedchain 200 performs at least one of combining and separating one or more of components and configurations of a first signal of a first frequency band and a second signal of a second frequency band into an intermediary signal 202. The preliminary feedchain 200 may be physically and communicatively connected to the feedchain 100 of FIG. 1. The preliminary feedchain 200 may provide the intermediary signal 202 to the separating component 108 of FIG. 1. The intermediary signal 202 may be the intermediary signal 102 of FIG. 1.

The preliminary feedchain 200 includes an intermediary signal first diplexer 212. The intermediary signal first diplexer 212 receives an intermediary right hand (RH) transmit (Tx) signal 214 of the intermediary signal 202. The intermediary RH Tx signal 214 is a signal of the frequency band of the intermediary signal 202. The intermediary RH Tx signal 214 is a transmit signal. The intermediary RH Tx signal 214 is linearly polarized. The RH Tx signal 214 is a signal that is right handed circularly polarized (RHCP) when combined into the into the intermediary signal 202.

The intermediary signal first diplexer 212 further receives an intermediary RH receive (Rx) signal 216 of the intermediary signal 202. The intermediary RH Rx signal 216 is a signal of the frequency band of the intermediary signal 202. The intermediary RH Rx signal 216 is a receive signal. The intermediary RH Rx signal 216 is linearly polarized. The RH Rx signal 216 is a signal that is RHCP when combined into the into the intermediary signal 202.

The intermediary signal first diplexer 212 combines the intermediary RH Tx signal 214 and the intermediary RH Rx signal 216 into an intermediary RH signal 218. The intermediary signal first diplexer 212 provides the intermediary RH signal 218 to a symmetrical orthomode transducer 220, further described below.

The preliminary feedchain 200 further includes an intermediary signal second diplexer 222. The intermediary signal second diplexer 222 receives an intermediary left hand (LH) Tx signal 224 of the intermediary signal 202. The intermediary LH Tx signal 224 is a signal of the frequency band of the intermediary signal 202. The intermediary LH Tx signal 224 is a transmit signal. The intermediary LH Tx signal 224 is linearly polarized. The LH Tx signal 224 is a signal that is left handed circularly polarized (LHCP) when combined into the into the intermediary signal 202.

The intermediary signal second diplexer 222 further receives an intermediary LH Rx signal 226 of the intermediary signal 202. The intermediary LH Rx signal 226 is a signal of the frequency band of the intermediary signal 202. The intermediary signal LH Rx signal 226 is a receive signal. The intermediary LH Rx signal 226 is linearly polarized. The LH Rx signal 226 is a signal that is LHCP when combined into the into the intermediary signal 202.

The intermediary signal second diplexer 222 combines the intermediary LH Tx signal 224 and the intermediary LH Rx signal 226 into an intermediary LH signal 228. The intermediary signal second diplexer 222 provides the intermediary LH signal 228 to the symmetrical orthomode transducer 220.

The preliminary feedchain 200 further includes the symmetrical orthomode transducer 220. The symmetrical orthomode transducer 220 combines the intermediary RH signal 218 and the intermediary LH signal 228 into an intermediary signal 230 in a dual fundamental mode waveguide. The symmetrical orthomode transducer 220 is configured in an orthomode configuration.

The preliminary feedchain 200 further includes a corrugated polarizer 232. The corrugated polarizer 232 receives the intermediary signal from the symmetrical orthomode transducer 220 and polarizes the received intermediary signal to a circular polarization. The corrugated polarizer 232 circularly polarizes the preliminary signal 230 into the intermediary signal 202. The corrugated polarizer 232 may be physically and communicatively connected to a second orthomode transducer, such as the second orthomode transducer 106 or the feedchain 100 of FIG. 1.

Figure 3A:
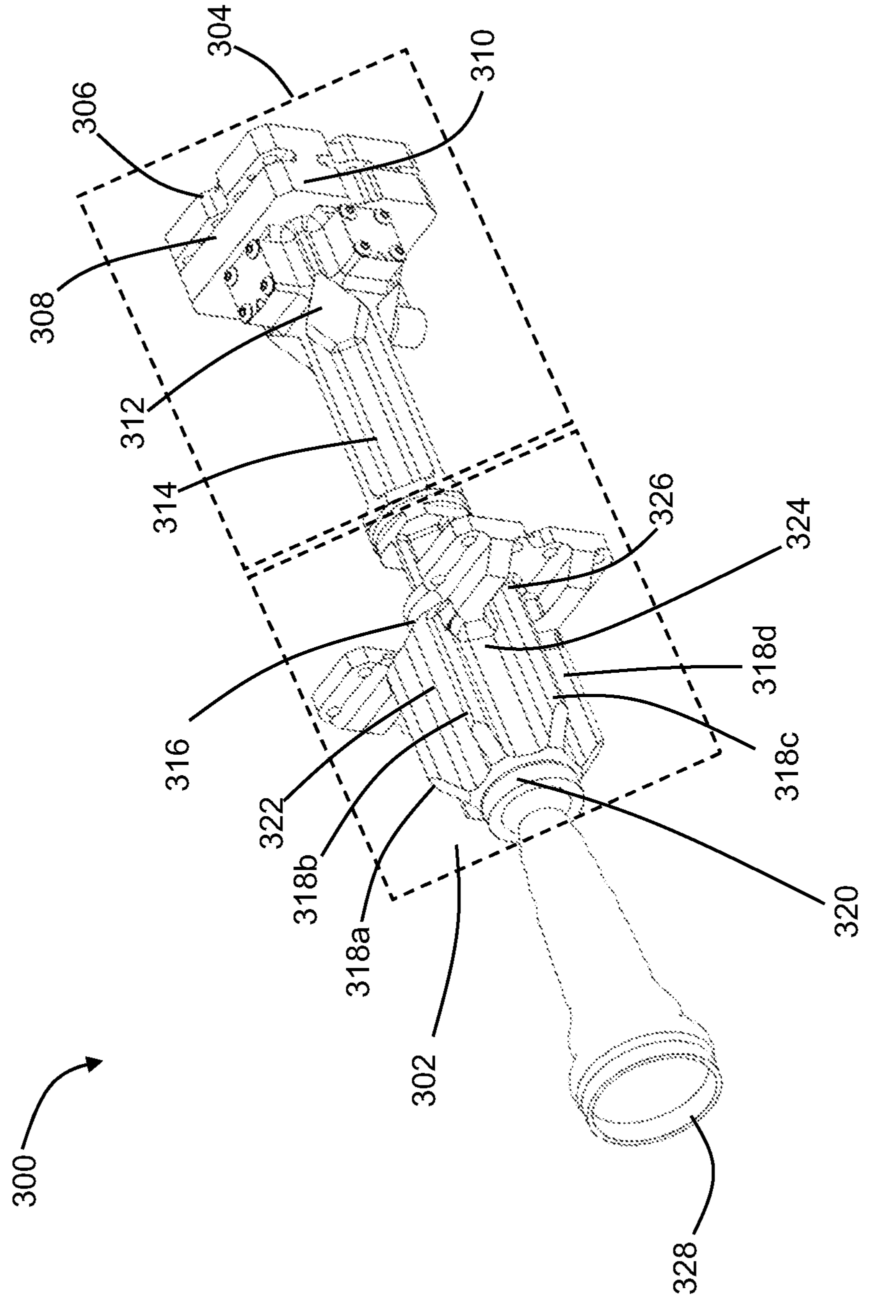
FIG. 3A is a perspective view schematic diagram of the waveguide of FIG. 1, according to an embodiment.

Referring now to FIG. 3A, shown therein is a waveguide 300 with a feedchain 302 configured in a six arm feedchain configuration in connection with a preliminary feedchain 304, according to an embodiment. The feedchain 302 may be the feedchain 100 of FIG. 1. The preliminary feedchain 304 may be the preliminary feedchain 200 of FIG. 2.

The waveguide 300 includes the preliminary feedchain 304. The preliminary feedchain 304 combines components and/or configurations of first signal and a second signal.

The preliminary feedchain 304 comprises a waveguide interface 306. The waveguide interface receives components and/or configurations of the first signal and the second signal from an external source.

The preliminary feedchain 304 further includes a first intermediary signal diplexer 308. The first intermediary signal diplexer 308 may be the intermediary signal first diplexer 212 of FIG. 2 or the intermediary signal second diplexer 222 of FIG. 2. The first intermediary signal diplexer 308 may receive a Tx and Rx component of the first signal and the second signal from the waveguide interface 306. The intermediary signal second diplexer 222 combines the signal components it receives. The components may be of one of a left handed circular configuration and a right handed right handed circular configuration.

The preliminary feedchain 304 further includes a second intermediary signal diplexer 310. The second intermediary signal diplexer 310 may be the intermediary signal first diplexer 212 of FIG. 2 or the intermediary signal second diplexer 222 of FIG. 2. The second intermediary signal diplexer 310 may receive a Tx and Rx component of the first signal and the second signal from the waveguide interface 306. The intermediary signal second diplexer 222 combines the signal components it receives. The components may be of one of a left handed circular configuration and a right handed right handed circular configuration not combined by the first intermediary signal diplexer 308. The second intermediary signal diplexer 310 may be configured at substantially a right angle to the first intermediary signal diplexer 308.

The preliminary feedchain 304 further includes a symmetrical orthomode transducer 312. The symmetrical orthomode transducer 312 may be the symmetrical orthomode transducer 220 of FIG. 2. The symmetrical orthomode transducer 312 is physically and communicatively connected to the first intermediary signal diplexer 308 and the second intermediary diplexer 310. The symmetrical orthomode transducer 312 receives from the first intermediary signal diplexer 308 and the second intermediary diplexer 310 and combines the received signals into an unpolarized intermediary signal.

The preliminary feedchain 304 further includes a corrugated polarizer 314. The corrugated polarizer 314 may be the corrugated polarizer 232 of FIG. 2. The corrugated polarizer 314 is physically and communicatively connected to the symmetrical orthomode transducer 312. The corrugated polarizer 314 receives the intermediary signal from the symmetrical orthomode transducer 312. The corrugated polarizer 314 circularly polarizes the intermediary signal. The corrugated polarizer is physically and communicatively connected to a second orthomode transducer 316 of the feedchain 302.

The waveguide 300 includes the feedchain 302. The feedchain 302 may be the feedchain 100 of FIG. 1. The feedchain 302 combines a third signal with the intermediary signal received from the preliminary feedchain 304.

Figure 3C:
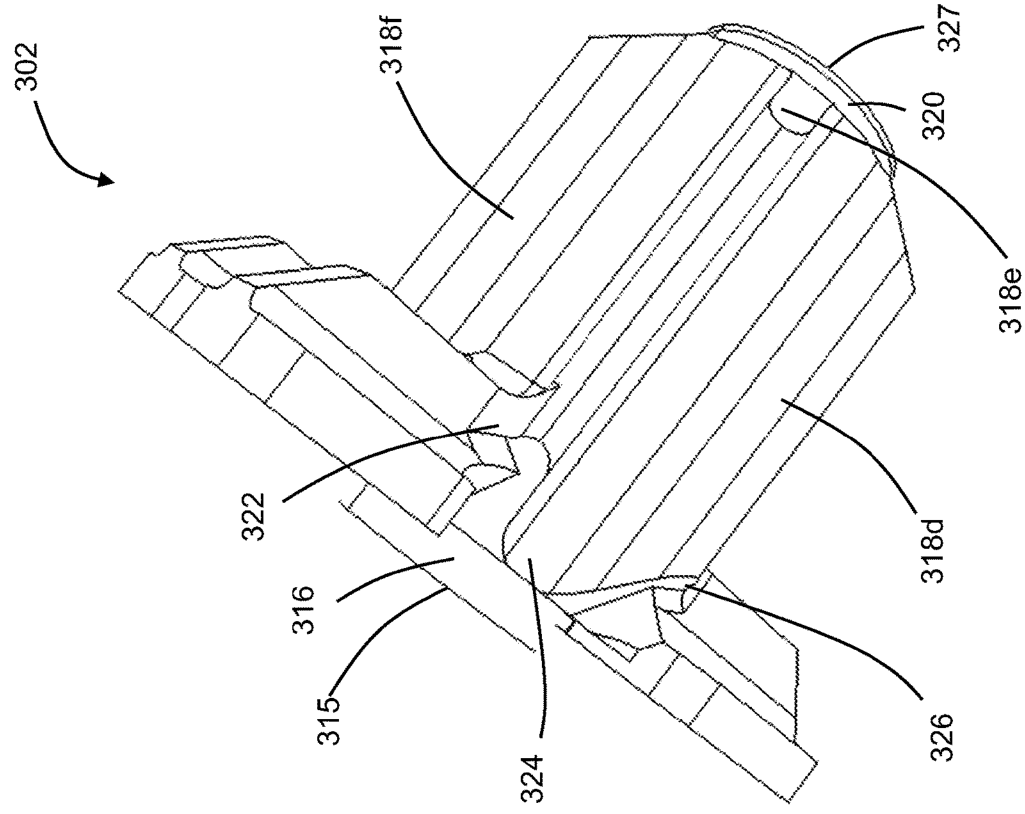
FIG. 3C is a further perspective view schematic diagram of the feedchain of 3A, according to an embodiment.
Figure 3B:
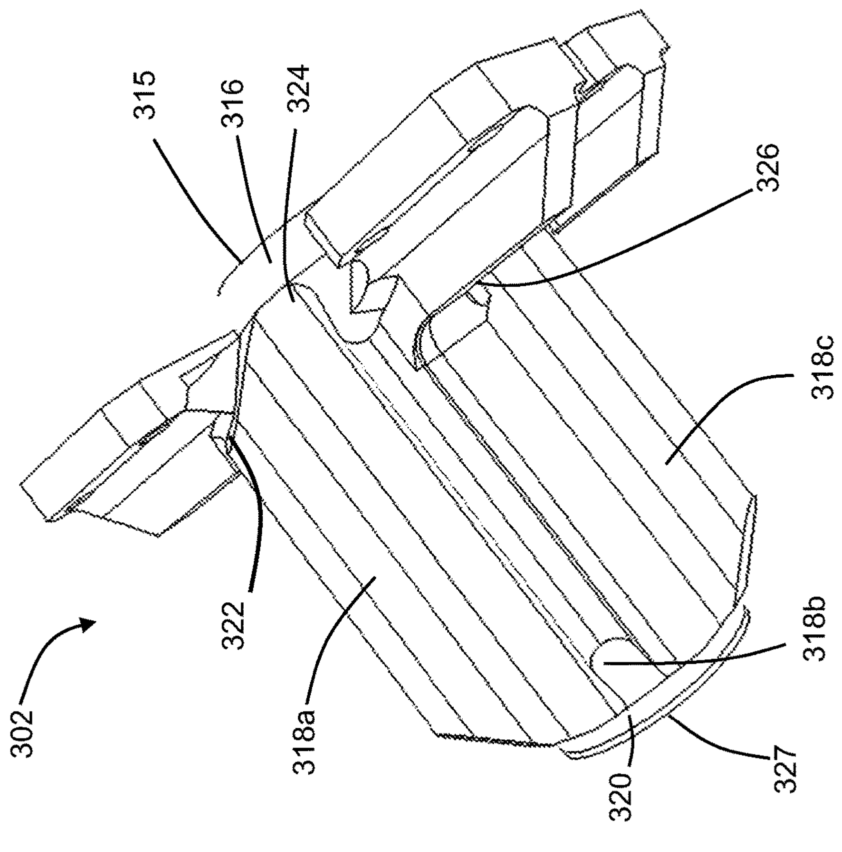
FIG. 3B is a perspective view schematic diagram of the feedchain of FIG. 3A, according to an embodiment.

Referring also to FIGS. 3B and 3C, shown therein is a first and second perspective view of the feedchain 302, according to an embodiment. The feedchain 302 includes a preliminary port 315. The feedchain 302 is physically and communicatively connected to the preliminary feedchain 304 at the port 315. The intermediary signal is provided to the feedchain 302 by the preliminary feedchain 304 through the port 315.

The feedchain 302 includes the second orthomode transducer 316. The second orthomode transducer 316 may be the separating component 108 of FIG. 1A. The second orthomode transducer 316 is configured to physically and communicatively connect to the corrugated polarizer 314 of the preliminary feedchain 304. The connection is via preliminary port 315. The second orthomode transducer 316 receives the intermediary signal from the preliminary feedchain 304. The second orthomode transducer 316 is configured in an orthomode configuration.

The feedchain 302 further includes six reject filters 318*a*-318*f*. The reject filters 318*a*-318*f* are referred to generically as reject filter 318 and collectively as reject filters 318. The reject filters 318 may be the reject filters 110 of FIG. 1. The reject filters receive the intermediary signal from the second orthomode transducer 316. Each reject filter 318 provides a port in addition to the preliminary port 315 and the output port 327, further described below, of the through port. This provides a total of eight ports.

The reject filters 318 are configured at a 60 degree spacing about the turnstile 320, further described below. The reject filters or branches may be spaced 60 degrees apart from one another about the turnstile 320. The 60 degree spacing provides symmetry for the third signal every 60 degrees to avoid exciting high modes such as TE31. The symmetry allows for higher frequency bands to be used without exciting high modes such as TE31. In this configuration, a 2.3 or higher frequency ratio may be achieved.

The reject filters 318 are configured to provide a substantially equal path length between the second orthomode transducer 316 and the turnstile 320, further described below. The equal path length may be achieved by configuring the physical length of the reject filters 318 to an equal length. The signals filtered by the reject filter 318 may circularly polarized. For example, the split intermediary signals output from the orthomode transducer 316 to the reject filters 318 may be circularly polarized. In such embodiments, the equal path length of the provided by the reject filters 316 maintains a phase synchronization of the filtered signals. Therefore, the filtered signals remain substantially in phase when they are received by the turnstile 320, further described below.

The feedchain 302 further includes a third signal first diplexer 322. The third signal first diplexer 322 may be the third signal first diplexer 112 of FIG. 1. The third signal first diplexer 322 receives a third signal RH Tx signal of the third signal. The third signal first diplexer 322 further receives a third signal RH Rx signal of the third signal. The third signal first diplexer 322 combines the third RH Tx signal and the third signal RH Rx signal into a third RH signal. The third signal first diplexer 322 is physically and communicatively connected to a third signal septum polarizer 324, further described below. The third signal first diplexer 322 provides the third RH signal to the third signal septum polarizer 324.

The feedchain 302 further includes a third signal second diplexer 326. The third signal second diplexer 326 may be the third signal first diplexer 122 of FIG. 1. The third signal second diplexer 326 receives a third signal LH Tx signal of the third signal. The third signal second diplexer 326 further receives a third signal LH Rx signal of the third signal. The third signal second diplexer 326 combines the third signal LH Tx signal and the third signal LH Rx signal into a third LH signal. The third signal second diplexer 326 is physically and communicatively connected to the third signal septum polarizer 324. The third signal second diplexer 326 provides the third LHCP signal to the third signal septum polarizer 324.

The feedchain 302 further includes the third signal septum polarizer 324. The third signal septum polarizer 324 may be the third signal septum polarizer 120 of FIG. 1. The third signal septum polarizer 324 combines the third RH signal and the third LH signal 128 into the third signal 104. The third signal septum polarizer 324 circularly polarizes the linearly polarized third RH signal and third LH signal.

The feedchain 302 further includes a turnstile 320. The turnstile 320 may be the turnstile 130 of FIG. 1. The turnstile 320 is physically and communicatively connected to the reject filters 318 and the third signal septum polarizer 324. The turnstile 320 receives the third signal from the third signal septum polarizer 324. The turnstile 320 further receives the filtered intermediary signal from the reject filters 318. The turnstile 320 combines the third signal and the filtered intermediary signal into a final signal.

The feedchain 302 further includes an output port 327. The feedchain 302 outputs the final signal to a horn 328, further described below via the output port 327.

The waveguide 300 further includes a horn 328. The horn 328 is physically and communicatively connected to the feedchain 302. The connection is at the output port 327. The horn 328 radiates or receives the final signal for one or more of transmission and reception.

Figure 4:
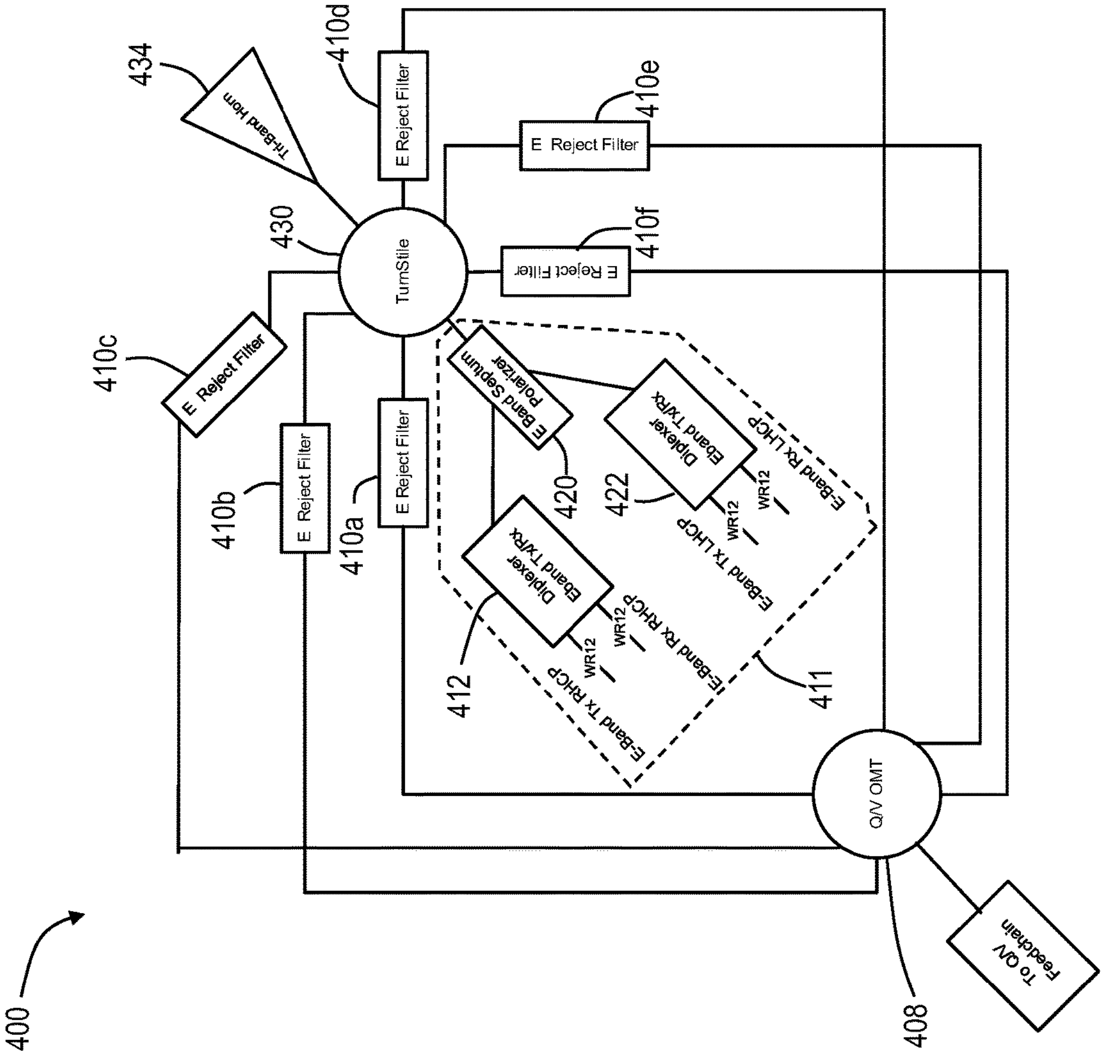
FIG. 4 is a block diagram of the feedchain of FIG. 1A including the third signal feedchain of FIG. 1C, according to a further embodiment.

Referring now to FIG. 4, shown therein is a block diagram of feedchain 400, according to an embodiment. The feedchain 400 includes a third signal feedchain 411. The feedchain 400 may be the feedchain 100 of FIG. 1A. The third signal feedchain 411 may be the third signal feedchain 111 of FIG. 1A as depicted in FIG. 1E.

The feedchain 400 includes a separating component 408. The separating component may be the separating component 108 of FIG. 1A. The separating component 408 is configured as an orthomode transducer (OMT). The separating component 408 is configured to support a Q/V band signal. The separating component 408 receives a Q/V band signal from a Q/V band feedchain such as the preliminary feedchain 200 of FIG. 2. The separating component splits the Q/V band signal and provides the signal to six E-band reject filters 410, further described below.

The feedchain 400 further includes six E-band reject filters 410*a*-410*f*. The reject filters 410*a*-410*f* are referred to generically as reject filter 410 and collectively as reject filters 410. The reject filters 410 may be the reject filters 110 of FIG. 1A. The reject filters 410 receive an intermediary signal (e.g., intermediary signal 102 of FIG. 1A) from the separating component 408. The reject filters 410 filter the Q/V signal in the E frequency band.

The feedchain 400 further includes an E-band feedchain 411. The E-band feedchain 411 provides an E-band to a turnstile 430 further described below.

The E-band feedchain 411 includes an E-band first diplexer 412. The E-band first diplexer 412 may be the third signal first diplexer 112 of FIG. 1E. The E-Band first diplexer 412 receives an E-band Tx right handed circularly polarized (RHCP) signal and an E-band Rx RHCP. The E-band first diplexer 412 combines the E-band Tx RHCP signal and the E-band Rx RHCP signal into an E-band RHCP signal. The E-band signal first diplexer 412 provides the E-band RHCP signal to an E-band signal septum polarizer 420, further described below.

The E-band feedchain 411 further includes an E-band second diplexer 422. The E-band second diplexer 422 may be the third signal second diplexer 122 of FIG. 1E. The E-Band second diplexer 422 receives an E-band Tx LHCP signal and an E-band Rx LHCP. The E-band second diplexer 422 combines the E-band Tx LHCP signal and the E-band Rx LHCP signal into an E-band LHCP signal. The E-band signal second diplexer 422 provides the E-band LHCP signal to the E-band signal septum polarizer 420.

The E-band feedchain 411 further includes the E-band septum polarizer 420. The E-band septum polarizer 420 combines the E-band RHCP signal and the E-band LHCP signal. The E-band septum polarizer 420 obtains the E-band signal by combining the E-band RHCP signal and the E-band LHCP signal.

The feedchain 400 further includes turnstile 430. The turnstile 430 may be the turnstile 130 of FIG. 1A. The turnstile 430 receives the E-band signal from the E-band feedchain 411 and the filtered Q/V signals from the reject filters 410. The turnstile 430 obtains a tri-band signal by combining the E-band signal and the filtered Q/V signals. The turnstile 430 outputs the tri-band signal to a tri-band horn 434, further described below.

The feedchain 400 further includes the tri-band horn 434. The tri-band horn 434 may be the horn 130 of FIG. 1A. The tri-band horn 434 receives the tri-band signal from the turnstile 430. The tri-band horn 434 radiates the tri-band signal for one or more of transmission and reception.

While the above description provides examples of one or more apparatus, methods, or systems, it will be appreciated that other apparatus, methods, or systems may be within the scope of the claims as interpreted by one of skill in the art.

The invention claimed is:

1. An apparatus for combining at least three frequency bands on a single waveguide, the apparatus comprising:

a turnstile supporting two orthogonal fundamental modes, the turnstile configured to receive and combine at least six filtered intermediary signals and a third signal to obtain a combined signal and to output the combined signal to an output port;

at least six reject filters each connected to and disposed about the turnstile, each respective reject filter configured to receive and filter a split intermediary signal to obtain a respective filtered intermediary signal and to provide the filtered intermediary signal to the turnstile; and wherein the split intermediary signals are of an intermediary signal frequency band comprising a first signal frequency band and a second signal frequency band, the third signal is of a third signal frequency band, and the first, second, and third frequency bands do not intersect;

wherein each respective reject filter is configured to filter at the third signal frequency band; and wherein the turnstile acts as a physical junction connecting one or more of the reject filters and comprises a third signal port for receiving or transmitting the third signal, the output port, and a port at each interface between the turnstile and each of the reject filters.

2. The apparatus of claim 1 further comprising a separating component communicatively and physically connected to each reject filter, the separating component configured to:

separate an intermediary signal to obtain the at least six split intermediary signals wherein the split intermediary signals are of substantially equal amplitudes; and provide one of the split intermediary signals to each reject filter.

3. The apparatus of claim 2, wherein the separating component is configured as an orthomode transducer.

4. The apparatus of claim 2, wherein the separating component comprises a plurality of magic tees.

5. The apparatus of claim 1, wherein the turnstile receives or transmits the third signal from a third signal feedchain communicatively and physically connected to the turnstile at the third signal port, the third signal feedchain configured to support the third signal and provide the third signal to the turnstile and wherein the third signal feedchain comprises:

a third signal first diplexer configured to receive and combine a third signal transmit right hand signal and a third signal receive right signal into a third right hand signal;

a third signal second diplexer configured to receive and combine a third signal transmit signal and a third signal receive signal into a third left hand signal; and a third signal septum polarizer communicatively and physically connected to the third signal first diplexer and third signal second diplexer configured to one or more of receive, combine, and circularly polarize the third right hand signal and the third left hand signal into a third signal.

6. The apparatus of claim 1 further comprising a preliminary feedchain comprising:

an intermediary signal first diplexer configured to receive and combine an intermediary right hand receive signal and an intermediary right hand transmit signal into an intermediary right hand signal;

an intermediary signal second diplexer configured to receive and combine an intermediary left hand receive signal and an intermediary left hand transmit signal into an intermediary left hand signal;

a symmetrical orthomode transducer communicatively and physically connected to the intermediary signal first diplexer and intermediary signal second diplexer and configured to combine the intermediary left hand signal and intermediary right hand signal into an intermediary unpolarized signal; and a corrugated polarizer communicatively and physically connected to the symmetrical orthomode transducer and configured to circularly polarize the intermediary unpolarized signal to obtain the intermediary signal, wherein the intermediary left hand signal component of the intermediary signal is left hand circularly polarized and the intermediary right hand signal component of the intermediary signal is right hand circularly polarized.

7. The apparatus of claim 1 further comprising a horn antenna communicatively and physically connected to the turnstile and configured to receive and radiate the combined signal.

8. The apparatus of claim 1, wherein the third signal frequency band is higher than the intermediary signal frequency band.

9. The apparatus of claim 1, wherein the first signal frequency band is one or more of 37.5-42.5 GHz and 10-15 GHz, the second signal frequency band is one or more of 47.2-51.4 GHz and 10-15 GHz, and the third signal frequency band is one or more of 71-76 GHz, 81-86 GHz, and 17-32 GHz.

10. The apparatus of claim 1, wherein the reject filters are disposed at an even spacing about a side of the turnstile and are configured to provide an equal path length from the separating component to the turnstile and wherein the third signal port is disposed at a first end of the turnstile and configured to receive or transmit the third signal orthogonally to the reject filters.

11. An orthomode transducer for separating an intermediary signal on a single waveguide, the intermediary signal being of an intermediary signal frequency band comprising a first signal frequency band and a second signal frequency band, the orthomode transducer configured to:

separate the intermediary signal to obtain at least six split intermediary signals; and provide each split intermediary signal to a corresponding reject filter of a tri-band waveguide, the tri-band waveguide configured to combine the split intermediary signals with a third signal of a third frequency band; and wherein the first, second, and third frequency bands do not intersect.

12. The apparatus of claim 11, wherein the third signal frequency band is higher than the intermediary signal frequency band.

13. The apparatus of claim 11, wherein the first signal frequency band is one or more of 37.5-42.5 GHz and 10-15 GHz, the second signal frequency band is one or more of 47.2-51.4 GHz and 10-15 GHz, and the third signal frequency band is one or more of 71-76 GHz, 81-86 GHz, and 17-32 GHz.

14. A method of combining a at least three frequency bands on a single waveguide, the method comprising:

separating, via a separating component, an intermediary signal into six split intermediary signals, wherein the six split intermediary signals are of substantially equal amplitudes;

providing each of the six split intermediary signals to a different one of six reject filters, each respective reject filter connected to and positioned about a turnstile;

at each respective reject filter:

filtering the received split intermediary signal to obtain a filtered intermediary signal, wherein the intermediary signal is of an intermediary signal frequency band comprising a first signal frequency band and a second signal frequency band; and outputting the filtered intermediary signal to the turnstile;

combining, by the turnstile, the filtered intermediary signals from each of the six reject filters and a third signal of a third signal frequency band into a combined signal; and outputting the combined signal.

15. The method of claim 14 further comprising obtaining the third signal from a third signal feedchain connected to the turnstile by:

receiving and combining by a third signal first diplexer a third signal transmit right hand signal and a third signal receive right hand signal into a third signal right hand circularly polarized signal;

receiving and combining by a third signal second diplexer a third signal transmit left hand signal and a third signal receive left hand signal into a third signal left hand signal; and one or more of receiving, combining, and linearly polarizing the third signal left hand signal and the third signal right hand signal to obtain the third signal via a third signal septum polarizer communicatively and physically connected to the third signal first diplexer and the third signal second diplexer.

16. The method of claim 14 further comprising radiating the combined signal by a horn antenna communicatively and physically connected to the turnstile.

17. The method of claim 14, wherein the third signal frequency band is higher than the intermediary signal frequency band.

18. The method of claim 14, wherein the first signal frequency band is one or more of 37.5-42.5 GHz and 10-15 GHz, the second signal frequency band is one or more of 47.2-51.4 GHz and 10-15 GHz, and the third signal frequency band is one or more of 71-76 GHz, 81-86 GHz, and 17-32 GHz.

19. The method of claim 14, wherein the reject filters are disposed at an even spacing about a side of the turnstile and are configured to provide an equal path length from the separating component to the turnstile and wherein the third signal feedchain is connected to the turnstile and disposed at a first end of the turnstile orthogonally to the reject filters.

20. The method of claim 14 further comprising obtaining the intermediary signal by:

receiving and combining an intermediary right hand receive signal and an intermediary right hand transmit signal into an intermediary right hand signal by an intermediary signal first diplexer;

receiving and combining an intermediary left hand receive signal and an intermediary left hand transmit signal into an intermediary left hand signal by an intermediary signal second diplexer;

combining the intermediary left hand signal and intermediary right hand signal into an intermediary unpolarized signal by a symmetrical orthomode transducer communicatively and physically connected to the intermediary signal first diplexer and the intermediary signal second diplexer; and circularly polarizing the intermediary unpolarized signal into the intermediary signal by a corrugated polarizer communicatively and physically connected to the symmetrical orthomode transducer, wherein the intermediary left hand signal component of the intermediary signal is left hand circularly polarized and the intermediary right hand signal component of the intermediary signal is right hand circularly polarized.

* * * * *